March 21, 1961 W. E. BURNS, JR 2,975,533
SEMAPHORE SIGNAL INSTRUCTOR
Filed Dec. 27, 1957 2 Sheets-Sheet 1
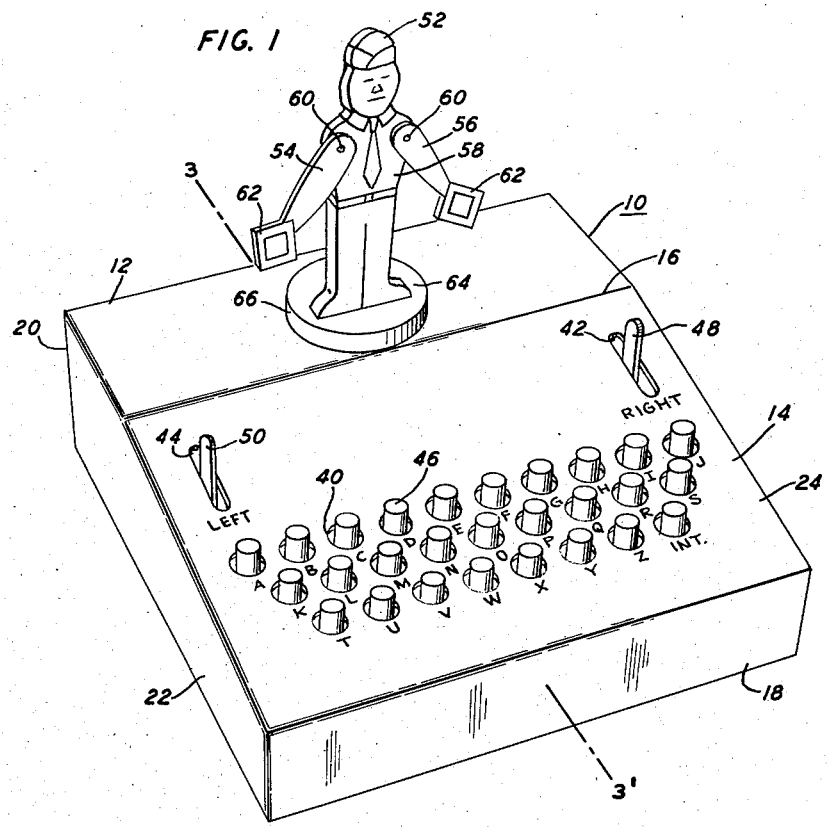
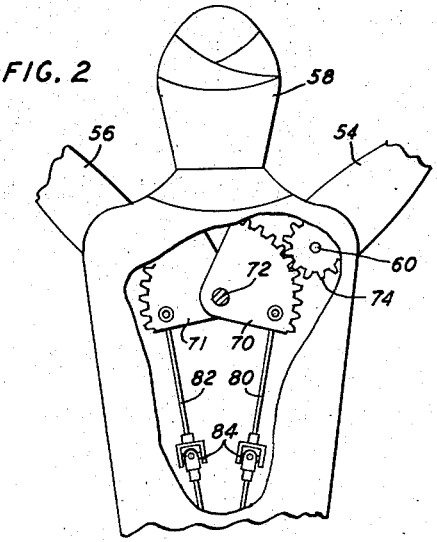
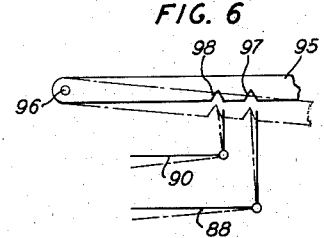
INVENTOR
WILLIAM E. BURNS, JR.
BY
Joseph C. Redmond Jr.
ATTORNEY March 21, 1961     W. E. BURNS, JR     2,975,533
SEMAPHORE SIGNAL INSTRUCTOR Filed Dec. 27, 1957     2 Sheets-Sheet 2

INVENTOR
WILLIAM E. BURNS, JR.
BY

ATTORNEY

United States Patent Office 2,975,533
Patented Mar. 21, 1961

2,975,533

SEMAPHORE SIGNAL INSTRUCTOR

William E. Burns, Jr., 5837 N. Hope St., Philadelphia, Pa.

Filed Dec. 27, 1957, Ser. No. 705,698

2 Claims. (Cl. 35—14)

This invention relates to educational devices and more particularly to a device for teaching semaphore signaling.

An object of the present invention is an improved device which is economical to manufacture for teaching semaphore signaling.

Another object of the invention is a device which is of simple construction and one that is especially easy for children to operate.

Still another object is a device which enables persons to be easily trained in sending and receiving semaphore signals.

In an illustrative embodiment the present invention comprises a housing including a keyboard and having a signal means mounted thereon. The signal means includes rotatable members which are suitably connected to control means located within the housing. The keyboard is connected to the control means such that by operation of a key included in the keyboard, the rotatable members are elevated to a position which corresponds to that key and no other key.

These and other objects of the present invention can be more fully apprehended from the following detailed specification taken in conjunction with the appended drawings in which:

Fig. 1 is a perspective view of the device of the present invention;

Fig. 2 is a rear enlarged and fragmentary elevational view of a signalman and signal arm members included in Fig. 1;

Fig. 6 is a diagrammatic sketch of the cooperation of a cam member and an angle bar to cause rotation of the signal arm members.

Figure 3:
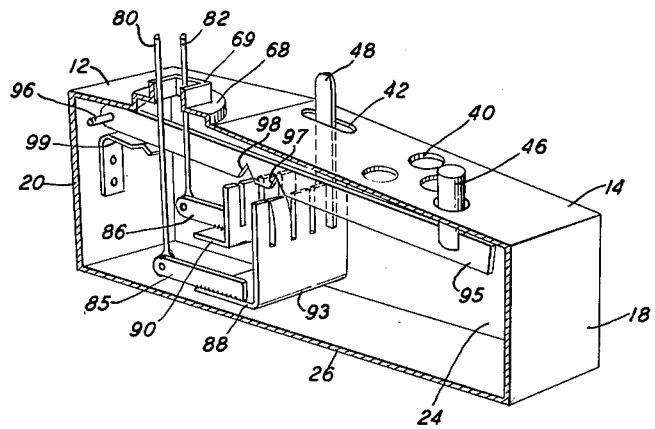
Fig. 3 is a sectional view in perspective of Fig. 1 along line 3—3' showing a key member therein in the normal position.

Referring now to Fig. 1, the present invention comprises a housing, 10, having a top surface 12, which includes a keyboard section 14. The surface 12 is bent along a line 16 to interconnect a front wall 18 and a rear wall 20 which are of different lengths. Completing the housing are side walls 22 and 24 and a base surface 26, the latter surface being best shown in Fig. 3.

The keyboard 14, shown in Fig. 1 has a plurality of circular holes 40 and two longated holes 42 and 44 therein. All circular holes except one are designated with a different letter of the alphabet, the one circular hole having the letters "INT" which is an abbreviation for interval or time lapse between words. The longitudinal holes are also identified, the hole 42 having the word "right" therebelow, whereas the hole 44 has the word "left." Extending through each circular hole is a button 46, whereas lever arms 48 and 50 extend through the holes 42 and 44 respectively.

A signalman 52 including signal arms or members 54 and 56 and a cylindrical body 58 shaped in human form is mounted on the top surface 12. Each arm is attached to the body member by a pin member 60 and includes a signal flag 62. The signal man has a base plate 64, the plate including a rim section 66 which snaps about a circular shoulder 68 (see Fig. 3) attached to the top surface 12. The shoulder 68 has an opening, not shown, which connects to a box shaped member 69 for reasons more apparent hereinafter. Inside the signal man body 58, as shown in Fig. 2 are segment gears 70 and 71 which are journaled on an axle 72, secured to the body 58 by suitable means. The segment gear 70 engages a spur gear 74 and similarly the gear 71 engages a spur gear (not shown). Each spur gear is attached to a different pivot pin 60 which is journaled in the body but integral with the associated arm member. The spur and segment gears are suitably aligned with respect to each other by spacer means (not shown) as is well known to a worker skilled in the art. As a consequence, rotation of the segment gear about the axle 72 causes rotation of the associated arm member in an increased amount.

Secured to the segment gears 70 and 71, are push rods 80 and 82 respectively. Each push rod includes a swivel 84 which permits the signal man to be rotated relative to the rods and the shoulder, on rotation the upper portion of the rods rotate with the signalman since they are attached thereto by means of the segment gears. The swivels permit the upper portion of the rods to rotate with respect to the lower portion thereof. Rotation of the signalman is limited to 180 degrees by suitable means. The operator of the present device may, as he sees fit, face the signalman toward him or away from him to simulate receiving or sending semaphore signals.

Figure 4:
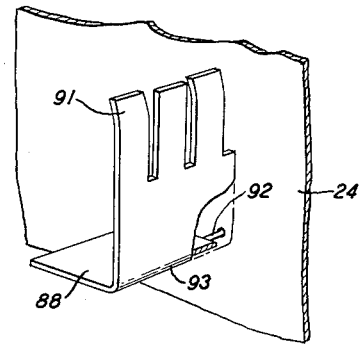
Fig. 4 is a fragmentary sectional view in perspective of Fig. 3 showing prebent tabs of an angle bar and the structure for supporting the bar.

Turning now to Fig. 3, it will be seen that push rods 80 and 82 extend through the rectangular cylinder 69 and into the housing 10, where the rods connect to control means including arm members 85 and 86 and angle bars 88 and 90. The member 85 is attached to the angle bar 88, whereas the arm member 86 is attached to the angle bar 90. Also attached to the angle bars are the lever arms 48 and 50 (see Fig. 1), the lever 48 being attached to the bar 88 whereas the lever 50 is attached to the bar 90. Besides the push rods and the arm members, the principal structure for supporting the angle bars is shown in Fig. 4. As shown there an angle bar includes prebent tabs or cam members 91 and a corner edge 93, the bar being suspended between the side walls 22 and 24 and above the base member 26 by means of pivot rods 92 at each end thereof, only one of which is shown. The angle bars are also suspended in stacked relation (see Fig. 3), the bar 90 being held above the bar 88. The spacing of the bars is selected to permit unequal rotation about their respective pivot rods without contacting each other. Corresponding tabs of each angle bar are in line with each other for reasons more apparent hereinafter.

Each angle bar is adapted to rotate about the pivot rod associated therewith. Where the walls of the housing are wood or other nonmetallic material the rods may be journaled in metallic triangle pieces secured to the side walls 22 and 24. The angle bar rotates, for reasons described hereinafter, a steady and continuous movement about the axis provided by pivot rods 92 journaled in the walls or other suitable means. Each prebent tab 91 is deflected as shown by Fig. 4. Some tabs in a bar could have similar deflection as other tabs in that bar or the other angle bar, but the combination of deflection in corresponding tabs of the angle bars is unique and is not repeated in any other combination of corresponding tabs in the angle bars. It is believed apparent at this time that each combination of deflection defines a particular letter of the alphabet or code word in the semaphore signal system.

Returning now to Fig. 3, it will be seen that a key 95 is journaled on an axle 96, which is suitably supported between side walls 22 (not shown therein but shown in Fig. 1) and 24. The key includes two notches or follower means 97 and 98 respectively and has attached thereto one of the buttons 46 previously described in connection with Fig. 1. The notches or followers are located in the key members so as to be in line with a particular combination of corresponding pre-bent tabs of the angle bars 88 and 90 respectively. Similarly, other keys are located in the housing in the same manner as that shown in Fig. 3, each key being associated with a particular combination of pre-bent tabs. All of the keys are held above the angle bars by a flat spring 99, which is riveted to the rear side wall 20, and in contact therewith.

Having described the construction of the present invention, the remaining paragraphs will be devoted to the operation of the device.

Figure 5:
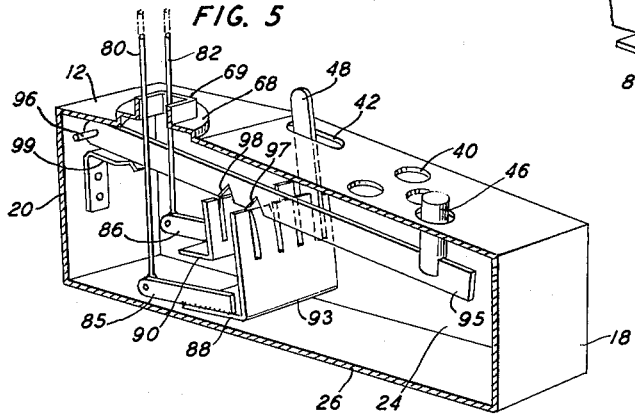
Fig. 5 is a sectional view in perspective of Fig. 1 along the line 3—3' showing the key member of Fig. 3 in the fully depressed or operated position.

When a button 46 is depressed against the spring 99, the notches or followers 97 and 98 of the key engage corresponding tabs or cams as shown in Fig. 5. As the button is depressed, a cam action occurs between the notches and the tabs to rotate the bars about their pivot rods 92. The cooperation between the angle bars and key members is shown in Fig. 6 wherein the angle bars 93 and key members 95 are indicated in diagrammatic relation. As shown there, the key member is represented in the normal position by the dotted lines and in the operated position by solid lines where an edge of the notch engages a cam or tab member included in the angle bar. The edge of the notch 97 slides along the surface of the tab or cam member to transmit the force of the key member to the angle bar. As a consequence, the fully depressed position of the button (Fig. 5), the angle bars are in rotated positions as a result of the camming action between the notches and the pre-bent tabs. Rotational movement of the angle bars causes translation of the push rods as a result of the arms 84 and 86 which interconnect the respective angle bars and push rods. Translation of the push rods rotate the segment gears which in turn rotate the respective spur gears to elevate the arms of the signal man to correspond to the letter or word indicated below the button depressed by the operator.

On release of the button, the spring 99, urges the key to return to the normal position wherein the base portion thereof is parallel to the base member 26. The arms of the signal man remain in the position dictated by the key depressed due to friendly friction in the mechanism.

In the event that the operator desires to test his skill, manual operation of the arms 54 and 56 is actuated by manipulation of levers 48 and 50. Lever 48 operating the signal man's right arm and lever 50 operating the left arm. The operator may then reproduce any letter on the keyboard by moving the levers which in turn rotate the angle bars to drive the signal arm members to positions indicative of the positions of the levers.

It is believed apparent that the present embodiment is only illustrative of the principles of the present invention. Other embodiments of the present invention may be made by those skilled in the art without departing from the spirit and scope of the present invention.

I claim:

1. An educational device comprising a housing having a plurality of apertures therein, a simulated signalman secured to said surface, said signalman including signal arm members, at least two angle bars mounted within the housing, means for connecting said signal arm members to said angle bars, each angle bar including a plurality of pre-bent tab members, means for mounting a plurality of key members within the housing, the key members having buttons at corresponding ends thereof which extend through the apertures in the surface of the housing, each key member having at least two notches therein which are in alignment with a different set of corresponding pre-bent tabs of the angle bars, and spring means for raising the key members away from the angle bars whereby operation of a key member causes the notches to engage the pre-bent tab members associated therewith causing rotation of the angle bars and movement of the signal arm members to a discrete position corresponding to that key member and no other key member.

2. An educational device comprising a housing having a surface including a plurality of apertures therein, a simulated signalman secured to said surface, said signalman including signal arm members, at least two angle bars mounted within the housing, means for connecting said signal arm members to different angle bars, each angle bar including a plurality of cam members, means for mounting a plurality of key members within the housing, the key members having buttons at corresponding ends thereof which extend through the apertures in the surface of the housing, each key member having at least two followers which cooperate with a different set of corresponding cam members of the angle bars which are in alignment, and spring means for raising the key members away from the angle bars whereby operation of a key member causes the followers to engage the cam members and rotate the angle bars which drive the signal arm members to a discrete position indicative of that key member and no other key member.

References Cited in the file of this patent

UNITED STATES PATENTS

| | | |
|---|---|---|
| 1,305,638 | Bamforth | June 3, 1919 |
| 1,729,890 | Meyer | Oct. 1, 1929 |
| 2,114,931 | Maurer et al. | Apr. 19, 1938 |
| 2,376,278 | Scheld et al. | May 15, 1945 |